United States Patent
Ferre et al.

(10) Patent No.: US 7,322,175 B2
(45) Date of Patent: Jan. 29, 2008

(54) CROP CONDITIONING ROLLER FLUTE SHAPE

(75) Inventors: Leonard M. Ferre, Winnipeg (CA);
Neil Gordon Barnett, Winnipeg (CA);
Geoffrey U. Snider, Winnipeg (CA);
David J. Jordan, Broken Arow, OK (US)

(73) Assignee: MacDon Industries Inc., Winnipeg, Manitoba (CA)

( * ) Notice: Subject to any disclaimer, the term of this patent is extended or adjusted under 35 U.S.C. 154(b) by 112 days.

(21) Appl. No.: 11/193,631

(22) Filed: Aug. 1, 2005

(65) Prior Publication Data
US 2007/0022726 A1 Feb. 1, 2007

(51) Int. Cl.
*A01D 61/00* (2006.01)

(52) U.S. Cl. .............................. 56/16.4 B; 56/16.4 C; 492/36; 492/37; 492/30; 241/294

(58) Field of Classification Search .............. 56/16.4 C, 56/16.4 B, 16.4 A; 460/70, 71, 72; 492/36, 492/37, 30, 13, 48, 47, 45; D15/28; 241/294; 411/399, 187, 188
See application file for complete search history.

(56) References Cited

U.S. PATENT DOCUMENTS

| | | | | |
|---|---|---|---|---|
| 1,219,927 A | * | 3/1917 | Dibbets | 100/176 |
| 3,146,568 A | * | 9/1964 | Mayer | 56/1 |
| 3,284,875 A | * | 11/1966 | Wood | 241/294 |
| 3,412,446 A | * | 11/1968 | Wood | 241/294 |
| 3,890,770 A | * | 6/1975 | Milliken | 56/16.4 A |
| 4,075,822 A | * | 2/1978 | Heckley et al. | 56/16.4 C |
| 4,796,645 A | * | 1/1989 | Kuchar | 460/71 |
| 4,821,494 A | * | 4/1989 | O'Halloran et al. | 56/16.4 C |
| 4,896,483 A | * | 1/1990 | O'Halloran et al. | 56/1 |
| 5,056,302 A | | 10/1991 | Rosenbalm et al. | |
| 5,192,245 A | * | 3/1993 | Francis et al. | 460/71 |
| 5,192,246 A | * | 3/1993 | Francis et al. | 460/72 |
| 5,280,696 A | * | 1/1994 | Quataert et al. | 56/16.4 A |
| 5,357,737 A | | 10/1994 | Ermacora et al. | |
| 5,413,531 A | * | 5/1995 | Tanis | 460/72 |
| 5,435,239 A | | 7/1995 | Talbot | |
| 6,220,007 B1 | | 4/2001 | Doerr et al. | |
| 6,346,067 B1 | * | 2/2002 | Walters | 492/36 |
| 6,435,966 B1 | * | 8/2002 | Heidjann et al. | 460/97 |

FOREIGN PATENT DOCUMENTS

CA 2406419 4/2004

* cited by examiner

*Primary Examiner*—Árpád Fábián Kovács
(74) *Attorney, Agent, or Firm*—Adrian D. Battison; Michael R. Williams; Ryan W. Dupuis

(57) ABSTRACT

A forage conditioner for conditioning cut crop material from a forage harvester includes a fixed bottom fluted roller carried in end housings and a top fluted roller which is pivotally mounted on the housings by a linkage pivotal relative to the housing about an axis lying in a plane at right angles to the roller axes so that the top roller is liftable from crushing position against the bias of a spring extending along the top roller. Flutes on the rollers are arranged with a first surface on one side which extends substantially radially outwardly to an apex and a second surface which has a first portion parallel to a tangent of the roller and a second portion inclined inwardly to the roller surface at an angle significantly less than 90 degrees. The bottom roller is arranged with the first surfaces leading to carry the crop into the area between the rollers and the top roller is arranged with the first surface trailing. Thus the first surface of intermeshing flutes pass through a condition in which the first surfaces are substantially parallel and on opposite sides of a line joining the centers of the rollers to provide an effecting conditioning action on the crop.

8 Claims, 8 Drawing Sheets

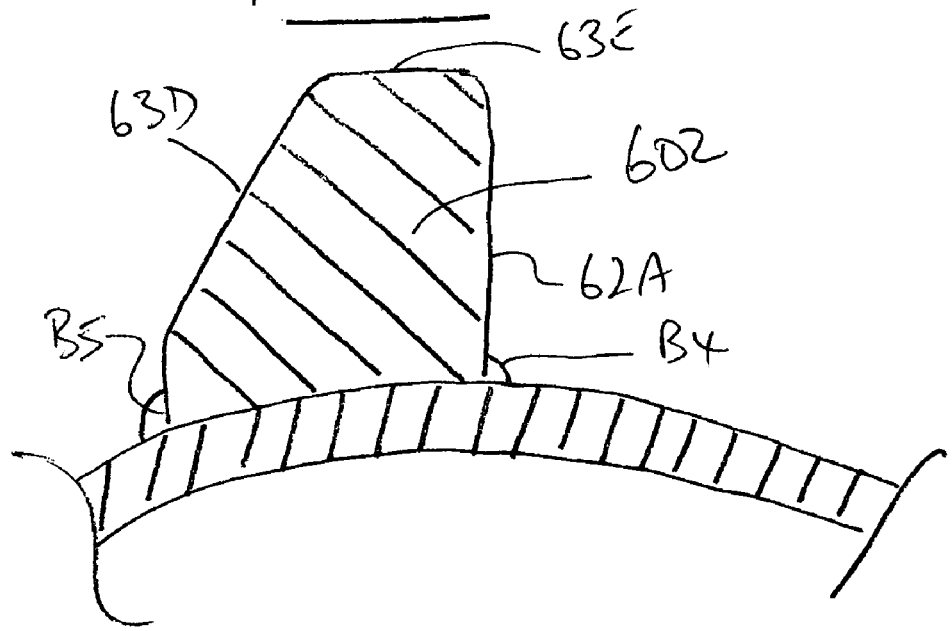
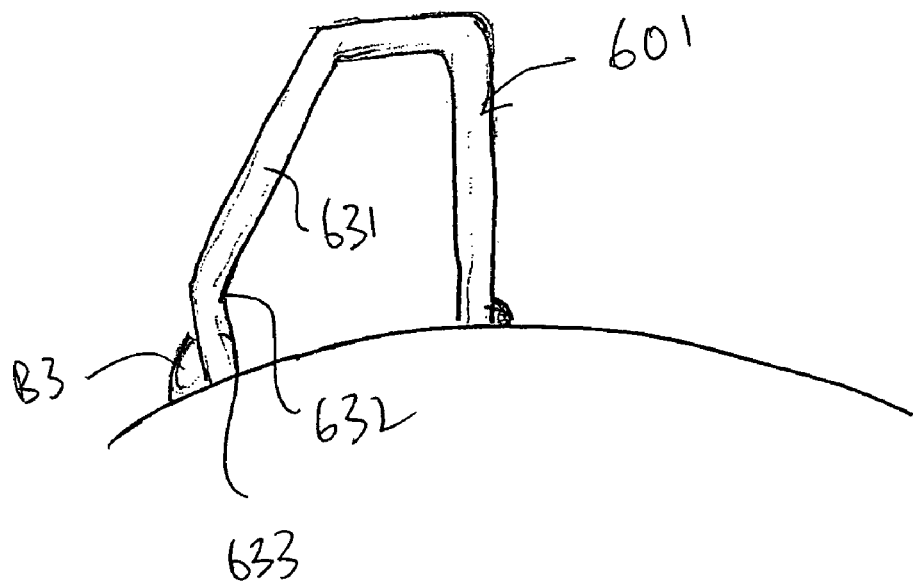

CROP CONDITIONING ROLLER FLUTE SHAPE

This invention relates to a conditioning roller assembly of the type comprising a pair of parallel rollers for use in conditioning hay or other forage crop which passes between the rollers and particularly to the shape of intermeshing flutes on the roller surfaces.

BACKGROUND OF THE INVENTION

Hay conditioners generally include a pair of rollers mounted in co-extensive parallel relationship for rotation about respective axes with the crop arranged to pass between the rollers in a conditioning action.

Some rollers provide a rubber or other elastomeric material at the surface where each of the rollers have sequential ribs and recesses around the periphery so that the ribs of one mesh into the recesses of the other while the rollers are in contact to provide pressure between the surfaces while they contact.

Such elastomeric rollers have been found to provide an effective conditioning action but are prone to wear and damage. Metal rollers with metal flutes are preferred for more effective wear characteristics but the conditioning effect must occur without contact and pressure between the rollers since the noise of contact and the undesirable cutting action on the crop material should be avoided.

Each of the metal rollers carries a plurality of longitudinally extending angularly spaced flutes which project outwardly from the surface of the roller. The rollers are spaced by a distance such that the flutes intermesh generally without contact between the rollers. The intermeshing of the flutes causes the crop material to be bent as it passes between the rollers causing a cracking of the waxy surface of the crop stem.

It is necessary in such rollers to allow one of the rollers, generally the top roller, to move in a direction to increase the spacing between the axes of the rollers to accommodate different amounts of crop material passing between the rollers and to accommodate obstacles such as stones and sticks which pass through without damage to the rollers. Generally this movement is provided by suspending each end of the top roller on a spring biasing system which allows each end independently to rise and lower in a floating action.

In view of the fact that the rollers carry intermeshing flutes, it is necessary to ensure that the rollers are driven in synchronism at all times including accommodating the lifting movement while synchronism is maintained.

A number of previous designs have been proposed and manufactured to provide the drive from the first roller to the second roller to maintain the necessary synchronism. One arrangement includes a gear box having an input attached to the bottom roller and an output shaft attached to the top roller. The output shaft includes universal joints which allows the output shaft to accommodate the up and down movement of the top roller shaft. The gear box arrangement is expensive and is of relatively wide width.

An alternative arrangement includes a double chain drive system. In this system, a drive sprocket on the end of the bottom roller and two idler sprockets are located in a common plane at right angle to the axis of the bottom roller at the apexes of a triangle. A chain wrapped around these three sprockets engages a fourth sprocket driven by the chain between the drive sprocket and one of the idler sprockets. A second chain communicates drive from a fifth sprocket coaxial with and co-rotatable with the fourth sprocket to a driven sprocket on the end of the top roller. The top roller is then positioned within the apexes defining the triangle and can pivot relative to the axis of the fourth and fifth sprocket. This arrangement is highly complex involving a high number of idler sprockets thus increasing cost and increasing chain wear. The double chain arrangement also significantly increases the width of the device since it must accommodate the two chains side by side.

A yet further arrangement is shown in U.S. Pat. No. 5,435,239 (Talbot) issued Jul. 25, 1995 and assigned to the present assignees. This shows a particular chain driving system which communicates drive from the bottom roller to the top roller while ensuring the proper synchronism despite changes in spacing between the rollers, while acting to minimize the size and complexity of the drive system.

However there remains a requirement to yet further increase the length of the rollers to maximize crop throughput and to minimize the amount of crop per unit length to obtain the best conditioning action on the crop. At the same time, the amount of space available is limited by the geometry of the supporting machine, and in some designs the conditioner is located between two spaced support legs of the frame of the machine which are set at a distance which cannot readily be changed. The only way therefore to increase the length of the rollers is to reduce the width of the drive system which must be accommodated at the end of the rollers between the legs. Attempts, such as that in the above Talbot patent have been made therefore for many years to minimize the complexity of the drive and therefore its dimension.

Prior U.S. Pat. No. 6,220,007 (Doerr) assigned to Vermeer, U.S. Pat. No. 5,056,302 issued Oct. 15, 1991 (Rosenbalm) assigned to Deere and U.S. Pat. No. 5,357,737 issued Oct. 25, 1994 (Ermacora) assigned to Kuhn all provide a design using meshing gears which connect from a gear on the driven bottom roller through idler gears to a driven gear on the top roller. In all these patents the top roller is mounted for movement in an arc about a pivot point. The gear arrangement is designed to minimize or reduce changes in angular timing between the rollers as they rotate while the distance between them is varying.

In Canadian Application 2,406,419 filed Oct. 4, 2002 and published in April 2004 by the present Assignees is disclosed an arrangement in which timing is communicated between the rollers by a resilient rubber star wheel on one of the rollers which meshes with a rigid gear wheel on the other. This arrangement has not proven to be successful.

At the same time, the shape and arrangement of the flutes must be selected to ensure effective conditioning. The above Talbot patent shows flutes which are simple rectangular bars welded on the exterior of the roller surface. These can be for example ⅜ inch wide by 1.0 inch high or 0.75 inch wide by 1.0 inch high. Another example of flute shape is provided simply by 90 degree symmetrical angle irons with the legs welded onto the roller surface so that the flute provides an inverted V-shape projecting from the surface. A further example has the same general V-shape but the legs are curved outwardly to simulate an involute shape. It has been generally believed that the action is merely one of bending the crop stem back and forth between the points of the intermeshing flutes so as to crack the stem. However close attention is currently being applied to improving the action so that the drying of the crop occurs more rapidly without cutting the crop into short lengths. The action of the rubber crushing rollers is known to be effective in crushing the stems into a flat condition which encourages drying by longitudinal cracking. In another example metal rollers are followed by a pair of rubber rollers in a compound system. While this may provide improved conditioning action, the cost of such a complex system may be prohibitive.

In U.S. Pat. No. 6,346,067 (Walters) is disclosed a conditioner roller which has a channel member crimped along a center line to form a groove which contains screw fasteners by which the channel member is removably bolted to the outside of the roller for ready replacement. The shape of the flute and its cooperation with the opposite roller is not discussed and presumably is not of interest.

In general, the following points are desirable for a crop conditioner:

Should condition crop to help the crop dry fast so it can be harvested sooner with less degradation in feed value.

Should have a minimum of cut off leaves and fine stems that will end up as harvesting losses and will lower the feed value.

Should have the ability to set the degree of conditioning by adjusting the degree of intermesh and angular timing for different crops or conditions.

Should feed well, that is the ability to pull in crop.

Should be durable.

Should leave crop with enough structural integrity to form a porous windrow that allows air movement to facilitate dry-down.

Basically, as set out above, two types of intermeshing roll type conditioners are popular on the market. One is intermeshing bars that provide crimp marks (sharp bends) by folding the crop over a bar. The others are elastomer (rubber or recycled tire materials) that operate at tighter clearances to squeeze the crop stems producing cracks or crushes along the length of the stems.

The crushing or cracking down the length of the stems tends to allow the individual stems to dry faster than crimping style. However this style rolls have the disadvantage of poorer feeding and leave the crop stems with less structural integrity that results in more dense and less even windrows in some conditions. They also more damage to the crop if they are set too aggressively or are feeding poorly. In some crops they feed so poorly that it is not practical to use them at all. Also, the durability of the elastomer rolls is generally much poorer than steel rolls.

Crimping style bars such as the v-bars shown in the attached pictures tend to be more gentle as long as they are set correctly for the crop. To tight an intermesh can result in greater losses due to more chopping of the crop. (Note the sharp corner is most prominent at the timing point that produces the greatest deflection of crop.)

SUMMARY OF THE INVENTION

It is one object of the present invention, therefore, to provide an arrangement of conditioning rollers which provides an improved shape and arrangement of the flutes for potential improvements in conditioning action.

According to one aspect of the invention there is provided a conditioner for conditioning cut crop material from a harvester comprising:

a bottom roller and a top roller, each of the bottom and top rollers having a generally cylindrical roller surface and a plurality of side by side flutes at angularly spaced positions therearound, the flutes projecting radially outwardly of a flute edge spaced outwardly of the roller surface and extending longitudinally along the roller substantially along the full length thereof;

a mounting assembly for mounting the bottom and top rollers in generally parallel relationship for rotation of each roller about its axis such that the flutes of the bottom roller intermesh with the flutes of the top roller;

a drive assembly for driving the bottom and top rollers at a common rotation speed in opposite directions to cause conditioning of crop material fed between the bottom and top rollers;

each flute of the bottom and top rollers comprising an angle member defined by a first plate and a second plate joined at a common apex;

each of the first and second plates having an edge thereof parallel to the apex and spaced from the apex;

the first plate having an extent from the apex to the edge which is shorter than that of the second;

the flutes being shaped and fastened to the surface of the roller such that:

the edges of the first and second plates butt against the surface with the apex spaced outwardly from the surface;

the second plate is bent so as to define a first portion at the apex and a second portion inclined to the first portion and inclined angularly around the surface and inwardly toward the surface at an angle to the surface less than ninety degrees;

the first plate extends from the edge thereof to the apex at an angle to the surface which is greater than the angle of the second portion.

The flutes may lie in an axial plane of the roller or may be helical, as is well known. In most cases axial flutes are preferred as they require less forming and the advantageous shape does not need the features commonly provided by the helical shape.

Preferably the first plate is substantially radial such that the apex is substantially radially outward of the edge of the first plate. While the plate or surface defined by the plate may be planar, it may be slightly curved by the forming process so that the apex is slightly retarded relative to the edge of the first plate at the roller surface. While the angle is preferably close to 90 degrees, it may vary slightly to an angle of the order or 80 degrees without interfering with the conditioning action.

While, as defined above the flute is formed by an angle member formed of plates, other formation techniques can be used which define the first and second surfaces having the characteristics set forth. Thus the flute may be formed from a solid bar.

Preferably the first portion of the second plate is substantially parallel to a tangent to the roller surface, that is substantially at right angles to the first surface.

Preferably the second portion of the second plate is generally planar.

Preferably the second portion of the second plate lies approximately at 45 degrees to a tangent to the roller surface.

The second portion of the second plate may be bent to form a third portion at a greater angle to the surface than the second portion.

Preferably the flutes of the bottom roller are arranged relative to a direction of rotation of the bottom roller such that the first plate is leading and the second plate is trailing.

Preferably the flutes of one of the rollers, generally the bottom roller, are arranged relative to a direction of rotation of said one of the rollers such that the first plate is leading and the second plate is trailing and the flutes of the other of the rollers, generally the top, are arranged relative to a direction of rotation of said other of the rollers such that the first plate is trailing and the second plate is leading.

In this way, the first plates of said one of the rollers and the first plates of said other of the rollers are arranged to pass through a condition in which the first plates of intermeshing flutes are parallel and on opposite sides of a line joining the centers of the rollers.

In this way the leading first surface of the flutes of the bottom roller are arranged, relative to the direction of rotation of the bottom roller, to carry the crop material into the space between the bottom and top rollers.

According to a second aspect of the invention there is provided a conditioner for conditioning cut crop material from a harvester comprising:

a bottom roller and a top roller, each of the bottom and top rollers having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the bottom and top rollers in generally parallel relationship for rotation of each roller about its axis such that the flutes of the bottom roller intermesh with the flutes of the top roller;

a drive assembly for driving the bottom and top rollers at a common rotation speed in opposite directions to cause conditioning of crop material fed between the bottom and top rollers;

each flute of the bottom and top rollers comprising a body defining a first surface and a second surface converging to a common apex;

each of the first and second surfaces having an edge thereof at the surface of the roller parallel to the apex and spaced from the apex;

the first surface being substantially radial such that the apex is substantially radially outward of the edge of the first surface;

the first surface having an extent from the apex to the edge thereof which is shorter than that of the second surface;

the second surface is shaped so as to define a first portion at the apex substantially at right angles to the first surface and a second portion inclined to the first portion and inclined angularly around the surface of the roller and inwardly toward the surface of the roller at an angle to a tangent to the surface of the roller less than ninety degrees.

According to a third aspect of the invention there is provided a conditioner for conditioning cut crop material from a harvester comprising:

a bottom roller and a top roller, each of the bottom and top rollers having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the bottom and top rollers in generally parallel relationship for rotation of each roller about its axis such that the flutes of the bottom roller intermesh with the flutes of the top roller;

a drive assembly for driving the bottom and top rollers at a common rotation speed in opposite directions to cause conditioning of crop material fed between the bottom and top rollers;

each flute of the bottom and top rollers comprising a body defining a first surface and a second surface converging to a common apex;

each of the first and second surfaces having an edge thereof at the surface of the roller parallel to the apex and spaced from the apex;

the first surface having an extent from the apex to the edge thereof which is shorter than that of the second surface;

the first and second surfaces being arranged such that a line joining the apex to the edge of the first surface lies at an angle to a tangent to the roller surface which angle is greater than a corresponding angle of a line joining the apex to the edge of the second surface relative to a tangent to the roller surface;

wherein the flutes of one of the rollers are arranged relative to a direction of rotation of said one of the rollers such that the first surface is leading and the second surface is trailing and the flutes of the other of the rollers are arranged relative to a direction of rotation of said other of the rollers such that the first surface is trailing and the second surface is leading.

BRIEF DESCRIPTION OF THE DRAWINGS

One embodiment of the invention will now be described in conjunction with the accompanying drawings in which:

FIG. 8 is a transverse cross sectional view through one flute showing an alternative cross sectional shape.

FIG. 9 is a transverse cross sectional view through one flute showing an alternative construction.

In the drawings like characters of reference indicate corresponding parts in the different figures.

DETAILED DESCRIPTION

Figure 1:
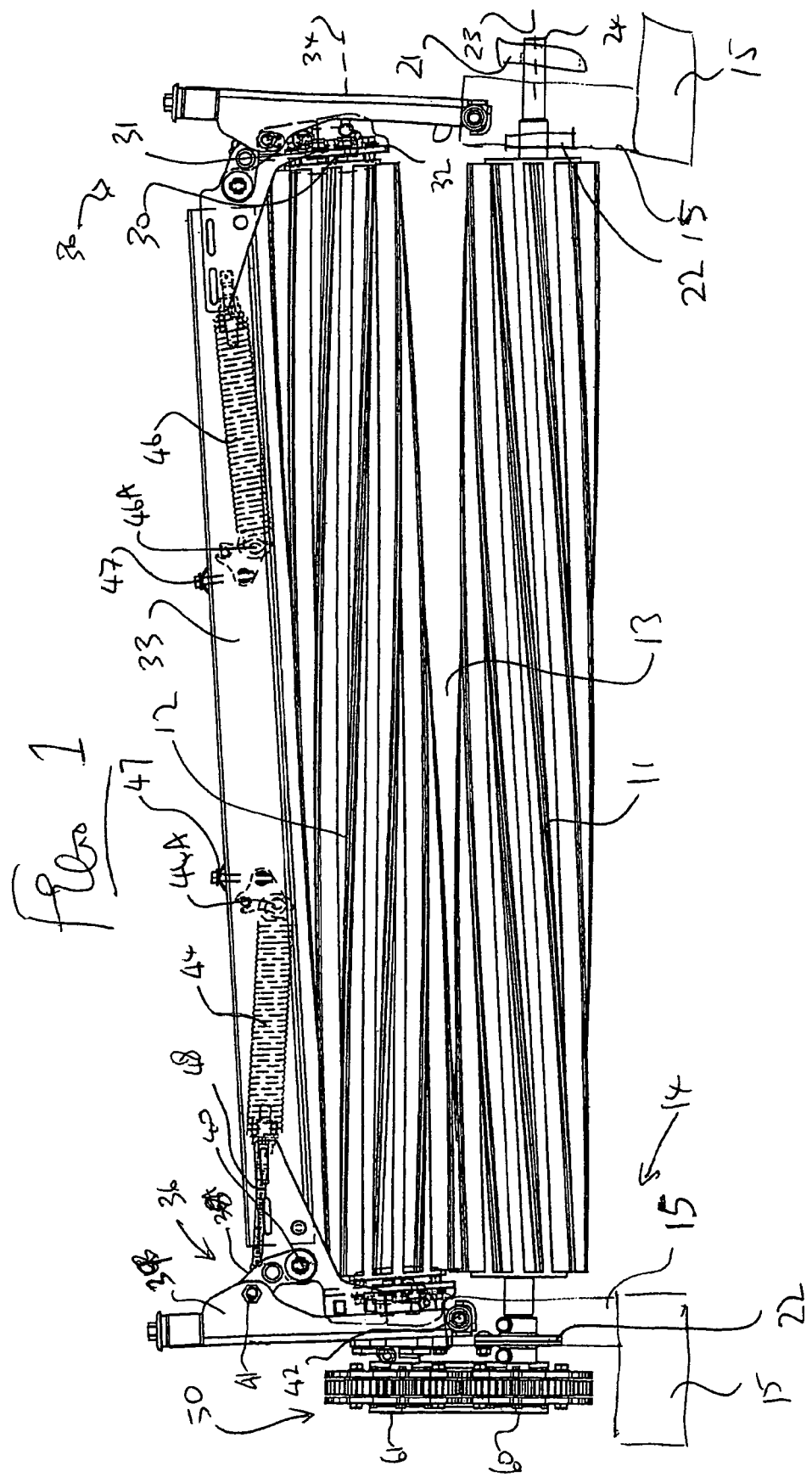
FIG. 1 is front elevational view of a forage conditioner according to the present invention.
Figure 2:
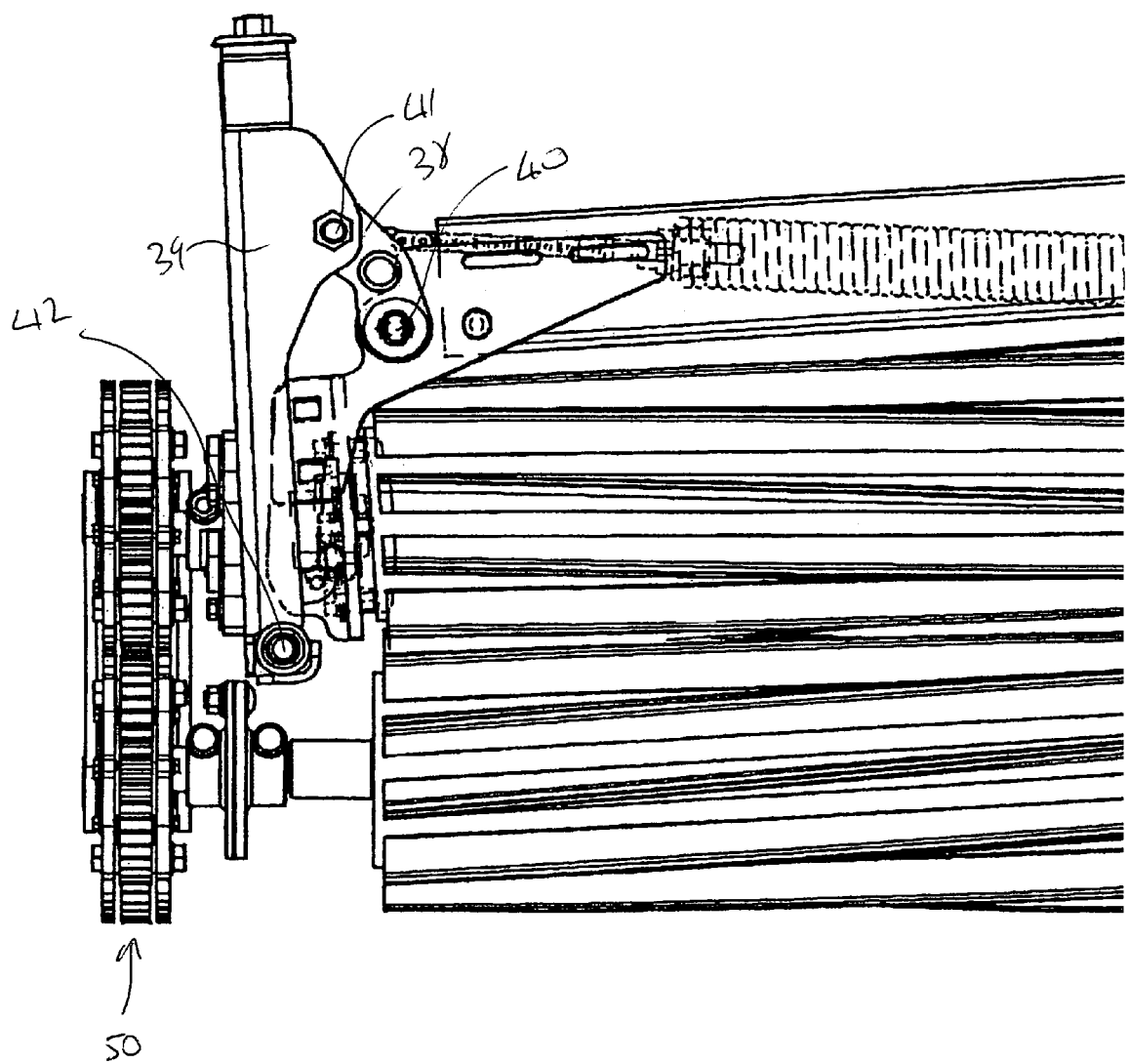
FIG. 2 is front elevational view of one end only of the forage conditioner of FIG. 1 on an enlarged scale showing the rollers in the closed position.
Figure 3:
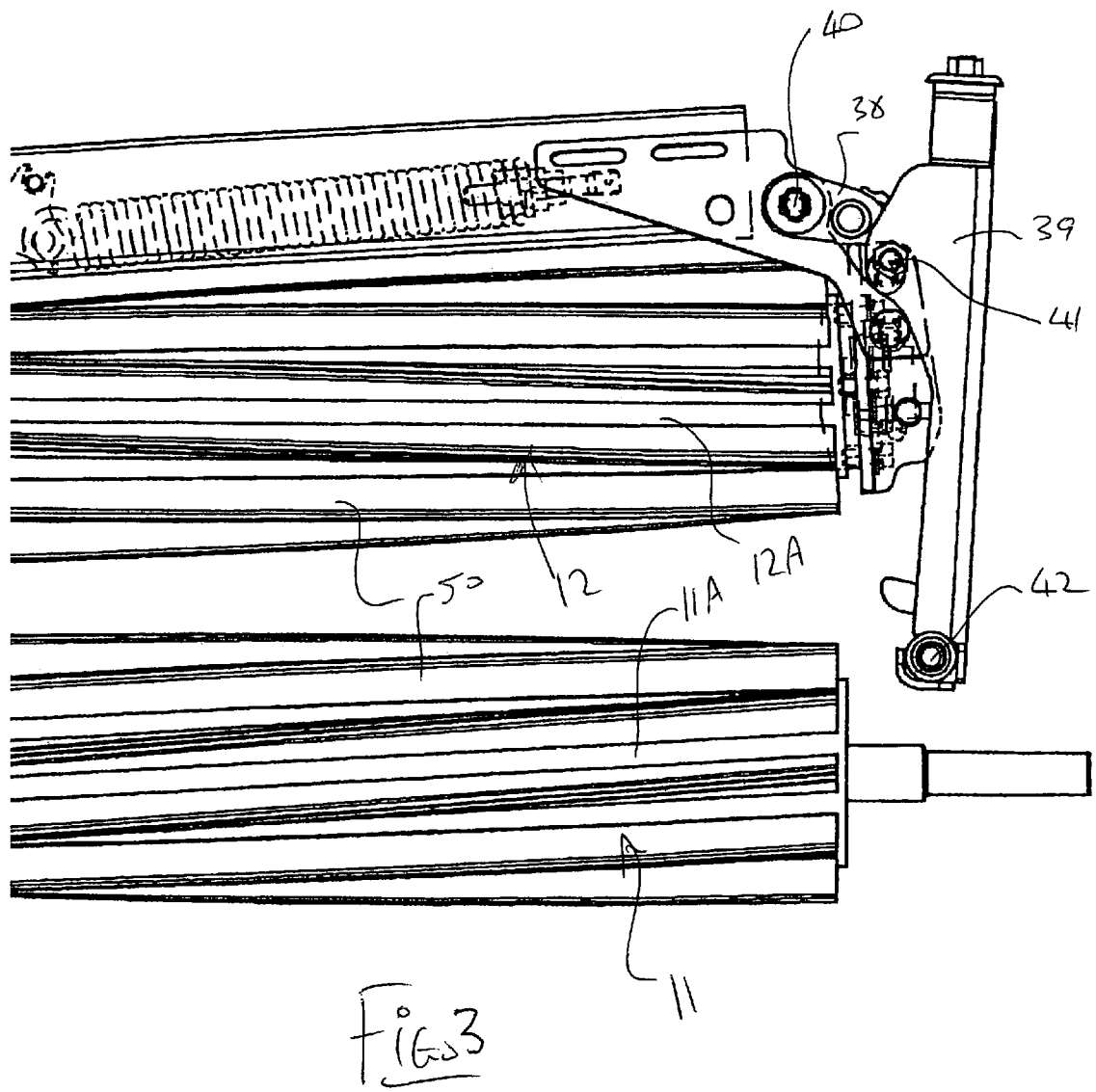
FIG. 3 is front elevational view of one end only of the forage conditioner of FIG. 1 on an enlarged scale showing the rollers in the open position.

A forage conditioner 10 comprises a first bottom roll 11 and a second top roll 12 which meet in a central area 13 through which the crop material passes in a conditioning action. The crop conditioner is mounted on a crop harvesting machine 14 the only part of which is shown is the supporting leg 15 which extends from a main frame structure downwardly and forwardly to provide support for a back sheet and a table.

The construction and arrangement of conditioners of this general type on a crop harvesting machine, particularly a swather is well known to one skilled in the art so it is not necessary to describe in detail the cooperation between the conditioning assembly and the harvester itself.

In general, the bottom roll 11 is fixed relative to a support housing 16 which is in turn mounted on the leg 15 so that the crop passes over the bottom roller 11 while that roller remains fixed in place between the leg 15 and a corresponding leg at the opposite end of the rollers 11 and 12.

The top roller 12 is spring biased downwardly onto the bottom roller so as to apply a downward force onto crop passing through the area 13. The top roller 12 can however rise from a closed position to a raised position in the event that a foreign object or a thick portion of the crop material passes through the area 13 thus forcing the rollers apart.

The housing 16 shown only schematically carries bearings 22 which support the fixed roller 11 at a fixed location on the housing and thus at a fixed location relative to the machine 14. The bearings allow rotation of the bottom roller 11 about an axis 23. A pulley 21 is directly mounted on a shaft 24 at the end of the roller 11 so that the pulley also remains on the axis 23 and fixed relative to the machine. The pulley is driven by a drive belt not shown. The shaft may also be driven by other means such as a hydraulic motor. As the bottom roller 11 is fixed, the drive to it is fixed.

The top roller 12 is mounted on a shaft 30 carried in two end bearings 31 each mounted on a respective support plate 32. Each support plate 32 extends along the respective end face of the roller 12 to a position beyond an upper edge of the end face where each support plate 32 is attached to a top beam 33 extending along the roller 12 across the top of the roller 12 and parallel to an axis 34 of the roller 12. Thus the roller 12 is supported in what is in effect a cradle defined by the top or cross beam 33 and the two depending support plates 32. The cradle itself is mounted for movement of the top roller in a direction upward and downward of the housing so as to move the roller 12 from a closed position in which the space 13 is a minimum set position to the raised position. Each end of the roller 12 can rise independently of the other end on the mounting linkage relative to the housing.

Each end of the top beam 33 is attached to the housing 16 by a linkage generally indicated at 36. The linkage 36 includes two links 38 and 39. The link 38 is pivotally mounted at one end on a pin 40 carried on the beam 33. The link 39 is pivotally connected at one end by on a pin 41 to the opposite end of the link 38 and extends generally downwardly therefrom to a pin 42 at its lower end where it is pivotally connected to the housing 16. As seen by comparing the closed position on the left hand end of the beam 33 and the open or raised position at the right hand end, upward movement of the roller and its beam causes the pin 40 to move upwardly which causes the link 38 to pivot about the pin 40 forcing the pin 41 outwardly. This outward movement is accommodated by pivoting movement of the link 39 about the bottom pin 42.

In this way the beam 33 at its respective end can move upwardly by pivotal movement of each of the link members relative to the corresponding mounting pins 40 and 41. This arrangement in which the axis of the pin 41 and the axis of the pin 40 are parallel and each lies in a plane at right angles to the axes 23 and 34 of the top and bottom rollers provides a large amount of movement of the end of the roller to accommodate larger foreign objects without causing damage to the structure.

Each of the rollers 11 and 12 includes an outer cylindrical roller surface 11A, 12A. On each of the outer cylindrical surfaces is provided a plurality of flutes 50 where the flutes 50 of the bottom roller are substantially identical to the flutes 50 of the top roller. The flutes and rolls are described in more detail hereinafter.

The top roller 34 in the closed position is supported such that the apexes of the top roller as they intermesh with the flutes of the bottom roller are spaced from the roller surface of the bottom roller. This closed position is supported by a suitable stop or abutment (not shown). The stop is adjustable so as to adjust the spacing between the apex of each roller and the roller surface of the other roller.

In the raised position of the top roller, the pivot pin 40 moves to a position above the pivot pin 41 so that there is sufficient spacing between the rollers that the flutes move out of intermeshing relationship.

Crop material passes from a position forward of the rollers rearwardly into engagement with the top roller and then the bottom roller so that the crop material passes between the intermeshed flutes of the rollers in the closed positions of the rollers. The crop material is thus bent over each of the apexes of the immediately intermeshing rollers to effect a conditioning action where the crop material is cracked to allow the escape of moisture.

The top roller is spring biased downwardly into contact with the crop by a pair of springs 44, 46 operating at opposite ends of the top roller. Each spring is mounted within the beam 33 so that they extend generally along the beam 33 from an inner end 44A, 46A carried on a bracket 47 attached to the beam 33. The outer end of the respective spring carries a threaded rod 48 which extends from the outer end of the spring to the pin 41 to which is attached by a collar located at the outer end of the link 38A. Thus the spring pulls inwardly tending to pull the pin 41 toward the end of the beam 33 and holding the structure in the closed position. In the event that the link 38A is pivoted outwardly about the pin 40 by lifting of the end of the roller, the rod 48 is moved outwardly thus tensioning the spring 44 until the rod sits on the pin 40 with the link 38 pulled to its outer position with the end of the roller thus lifting accordingly.

A single spring acting between both links can be used but it is preferred that two separate springs be used since these are then independent and thus allow more independent lifting of the two ends without a tendency for the lifting on one end to affect the lifting of the other end.

The two links and the spring at each end of the top roller provides a spring force tending to press the top roller downwardly. However this spring force can be controlled by the geometry so that it does not increase linearly proportional to the increase in spacing but instead is relatively constant throughout the movement or even decreases beyond a certain amount of movement. This provides a force tending to keep the rollers in the closed position and to apply pressure to the crop but does not provide an excessive force which can drive the top roller downwardly at a high velocity and with a high force onto bottom stops, in the event that the lifting force on the roller is suddenly removed, which could cause damage to the drive and mounting arrangements. The particular force profile can be readily selected by the geometry and dimension of the spring and links.

The amount of movement of the top roller, which is approximately equal to double the length of the first link 38, can be relatively large in comparison which other systems providing as much as 5 to 6 inches in potential movement.

Despite the centering effects of the two springs, the top roller can tend to move or slop side to side on the links and hence it is desirable to provide a guiding arrangement which guides the movement of the top roller in the vertical direction so as stop or limit the potential side to side movement.

A stop 42A on the link 39 can be adjusted upwardly and downwardly by a screw 42B and carriage 42C for engaging a pin 42D on the top roller mounting to control the minimum spacing position of the top roller relative to the bottom roller.

The control of the rotation movement of the first and second rollers is obtained by a timing system generally indicated at 50. This is shown in more detail in co-pending application Ser. No. 11/043,433 of the same assignee filed Jan. 27, 2005, the disclosure of which is incorporated herein by reference. Different timing systems can be used as will be well known to one skilled in this art. The timing system is adjustable so as to adjust the angular orientation of one roller relative to the other or the timing therebetween, as will be known to a person skilled in the art. Thus the roll drive and suspension gives the following functions:

Provides power to turn the rolls.

Provides the ability to adjust the degree of intermesh.

Provides the ability to hold and adjust angular synchronization (roll timing). Most systems use a slotted disk that is bolted to another component (disk, gear, or sprocket.)

Provides a spring or other means such as hydraulic or pneumatic pressure for applying force to hold rolls together but allow a foreign object or wad of crop to open the rolls to prevent plugging.

The arrangement described above provides one example which can provide these features but it will be appreciated that other examples are well known to a person skilled in this art.

Figure 4:
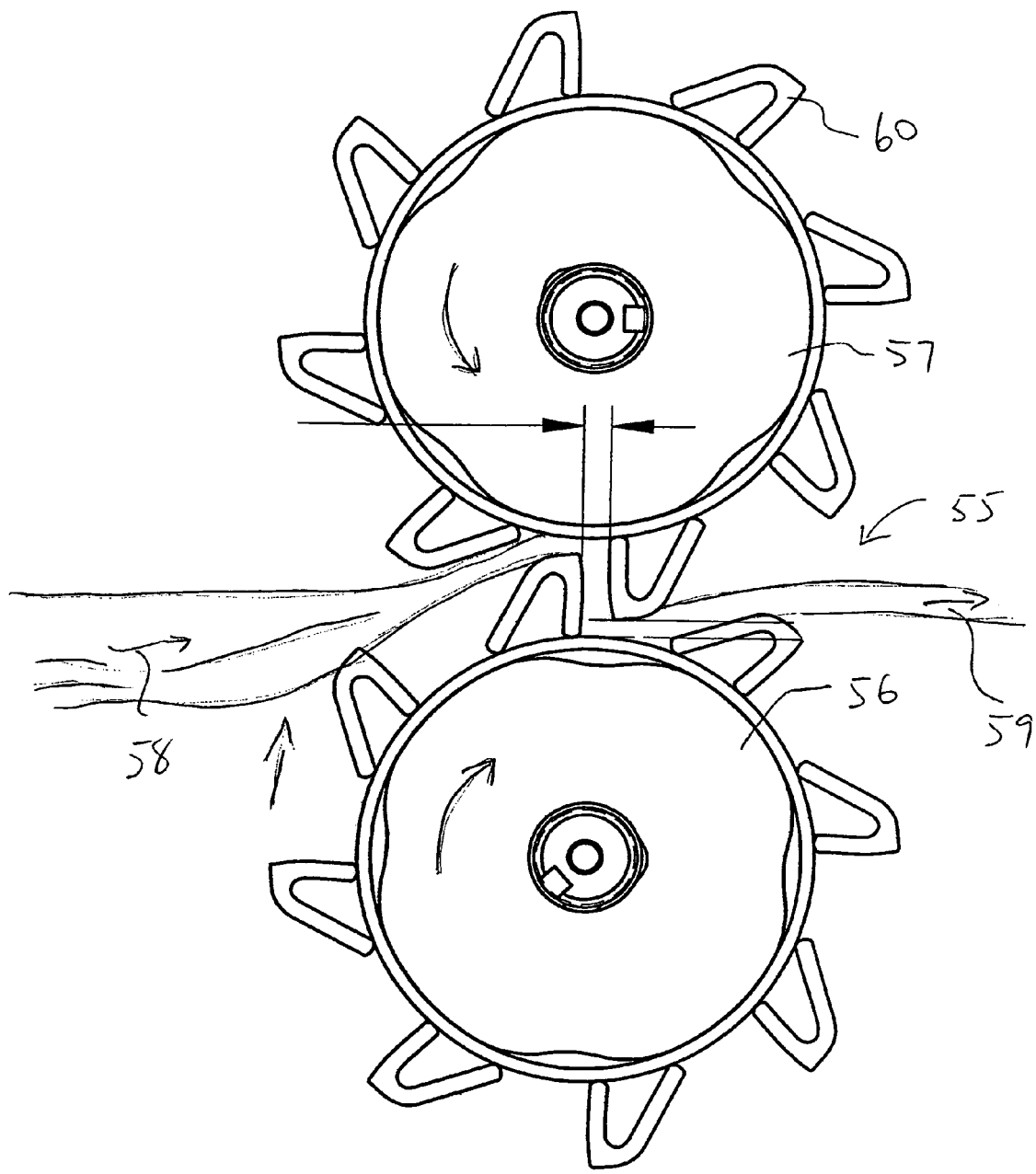
FIG. 4 is a transverse cross sectional view through the rollers of the embodiment of FIG. 1 showing the shape of the flutes.
Figure 5:
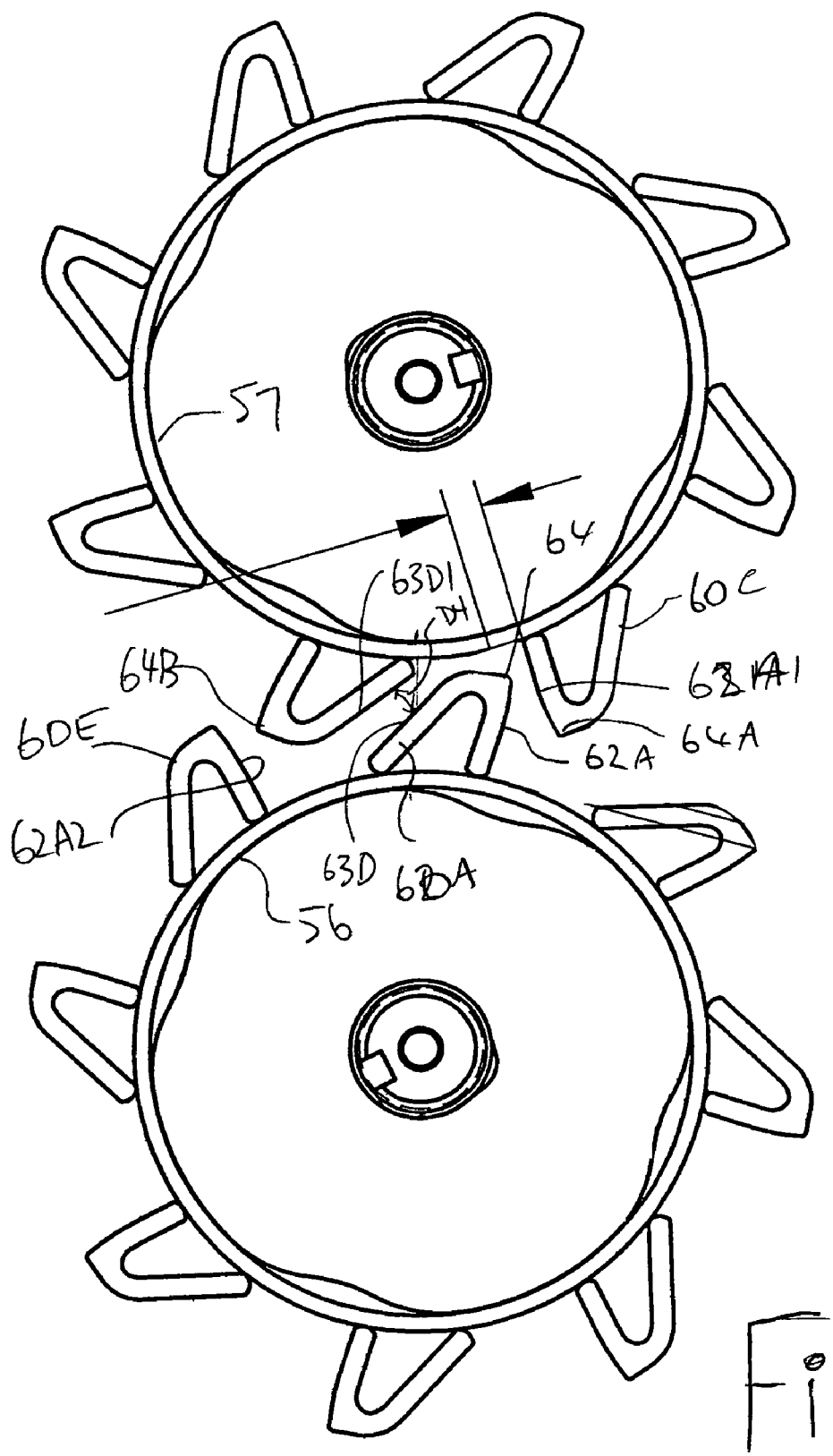
FIG. 5 is a transverse cross sectional view through the rollers similar to that of FIG. 4 showing the flutes angularly advanced.
Figure 6:
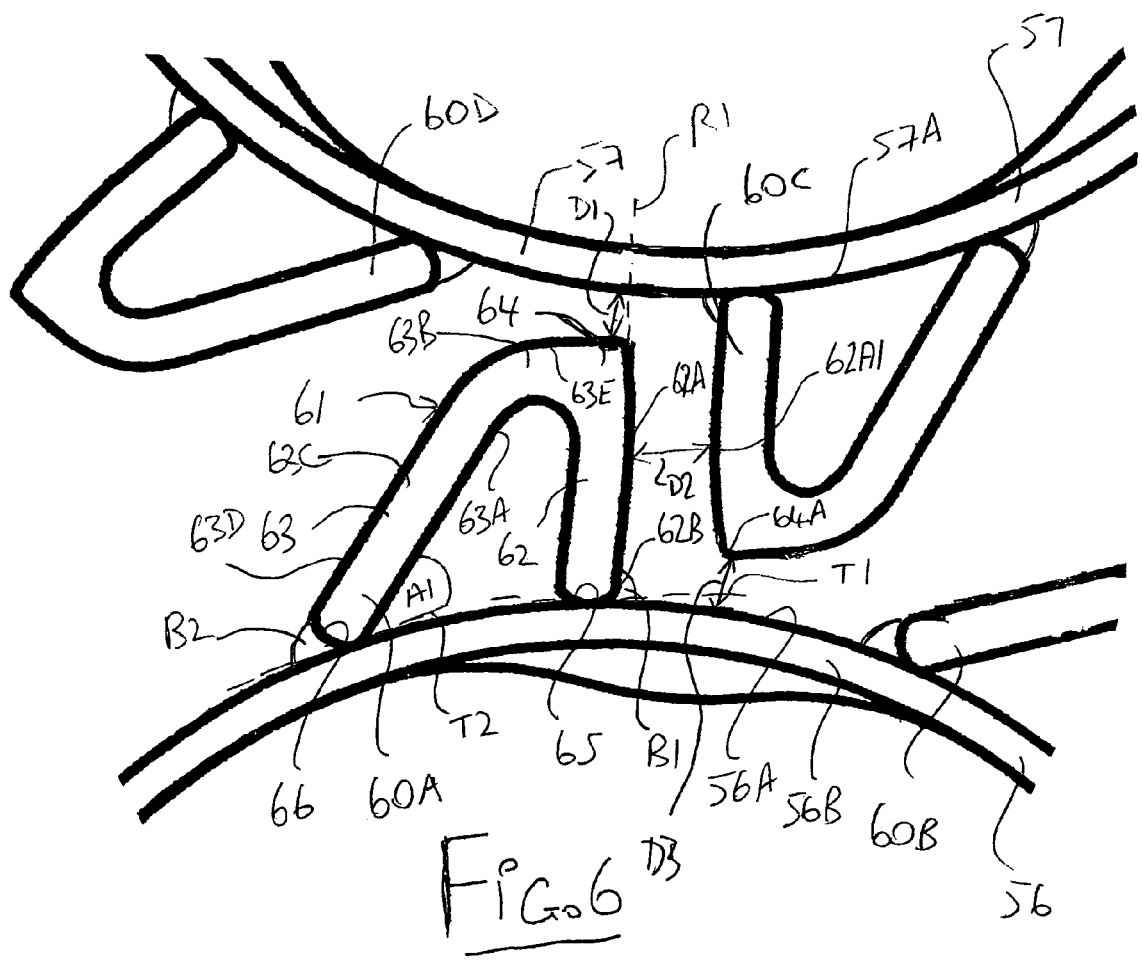
FIG. 6 is a transverse cross sectional view through the rollers similar to that of FIG. 4 on an enlarged scale.

The conditioner rollers are shown in more detail in FIGS. 4, 5 and 6 in which one embodiment is shown. The conditioner rollers generally indicated at 55 include a bottom roller 56 and top roller 57. The crop material is fed from the left as indicated at 58 and passes between the top and bottom rollers where a conditioning action occurs before the crop material is ejected rearwardly of the rollers and indicated at 59. Each of the rollers 56 and 57 includes a plurality of flutes generally indicated at 60. The flutes are all identical and are arranged at a suitable spacing around the roller. The number of flutes are shown is eight but this number can vary depending upon the diameter of the rollers and the dimensions of the flutes. The selection of suitable sizes and therefore suitable number of flutes can be made by a person skilled in the art based upon the analysis of required action and the amount of room required for the conditioner rollers.

In FIG. 6 the flutes are shown on an enlarged scale so that only four of the flutes are visible in the enlarged portion shown including a first flute 60A and a second flute 60B and the bottom roller 56 together with a flute 60C and a second flute 60D and the top roller 57.

Each of the flutes is formed in this embodiment from a commercially available angle member generally indicated by 61 which includes a first plate 62 and a second plate 63 converging to an apex 64. Such angle members are commercially available with the plates 62 and 63 at right angles and can be formed in a suitable machine tool to take up the shape shown in FIG. 6. The plate 62 has an end face 65 and the plate 63 has an end face 66. The plate 62 is substantially planar so that the end face 65 butts against the outer surface 56A of the wall 56B of the roller 56. The plate 63 is arranged so that it extends substantially at right-angles to a tangent T1. This defines a front surface 62A of the plate 62 which extends in a radial direction in a radial plane R1 so that the apex 64 lies in the common radial plane or radial line R1 with the edge of the surface 62A at the roller surface.

It is noted that the second plate 63 is bent at an area 63A so as to define a first portion 63B of the plate and the second portion 63C of the plate. These portions 63B and 63C are nominally planar but in the bending action, some curvature will occur particularly in the portion 63B which is relatively short in its extent from the apex 64. This bending also will tend to pull the apex 64 backwardly away from the plane R1 so that it is slightly retarded relative to the bottom edge of the surface 62A as indicated at 62B at the roller surface.

Thus the portion 63B of the plate 63 lies generally parallel to the tangent T1 so it extends at right-angles to the radial line R1 at the apex 64. The portion 63C is generally planar and extends from the rear-end of the portion 63B at the bend 63A at an angle A1 to a tangent T2 at the base of the portion 63C.

The ends 65 and 66 of the plates are welded to the roller surface by weld bead. The bead at the end 65 of the plate 62 is indicated at B1. The bead at the end 66 of the plate 63 is indicated at B2. It will be noted that the bead B2 is in effect hidden underneath the outer surface indicated at 63D of the plate 63 so it does not appear as a projection above that surface 63D.

In effect, therefore, the flute is defined by three surfaces including the surface 62A of the plate 62, the surface 63E of the portion 63B and the surface 63D of the portion 63C. These three surfaces are arranged generally such that the surface 62A is radial, the surface 63E is generally parallel to the surface of the roller at the edge of the surface 62A and the surface 63D lies up an angle A1 to the tangent T2 which angle is than ninety degrees. Thus the angle A1 is less than the ninety degree angle of the surface 62A relative to the tangent T1.

Thus the plate 63 is necessarily longer than the plate 62 since it extends from the apex and is inclined rearwardly and inwardly toward the roller surface from the apex 64.

It will be appreciated that the surface 62A does not need to accurately radial and can diverge from this angle forwardly or rearwardly over a narrow angle of the order of ten degrees without interfering with the operation of the system. The angle A1 is preferably in the order of forty-five degrees but can also vary between about thirty-five degrees and about sixty degrees without significantly interfering with the operation of the system.

As shown in FIG. 6, the surface 62A is parallel to a corresponding surface 62A1 of the flute 60C. Thus the flutes take up a position during the meshing movement of the flutes in which the surface 62A and 62A1 are parallel.

The rollers have a minimum approach distance as shown in FIG. 6 in which the apex 64 approaches the surface 57A of the roller 57 by a distance D1 which is approximately equal to the distance D2 between the surfaces 62A and 62A1. Symmetrically the apex 64A of the flute 60C is spaced from the surface 56A by a distance which is also approximately equal to the distances D1 and D2.

In operation, therefore, crop material passing between the rollers extends over the top of the surface of the flute 60A to the surface 57A of the roller 57 and then is turned substantially at a right-angle to pass between the surface 62A and 62A1 and then turns again at a right-angle to pass under the apex 64A and emerge under the outer surface of the flute 60C.

It will be noted that the flutes of the roller 56 have the first surface 62A of the flute as a leading edge which tends to grasp the crop material due to its sharp angle to the crop material and to carry that crop material into the space between the rollers.

The space D1 can thus be selected so as to provide a crushing action on the crop material as it is pinched between the apex 64 and the surface 57A. The crop material remains compressed between the surface 62A and the surface 62A1. The crop material is also compressed in the space D3 between the apex 64A and the surface 56A. Thus there is a crushing action along the length of the crop material tends to compress the crop material longitudinally to tend to cause longitudinal cracking.

It will be noted from FIG. 5, which shows a further position of rotation of the rollers 56 and 57, that the apex 64 tends to sweep along the surface 62A1 as the flutes 60A and 60C move gradually out of meshing arrangement and the next flutes move into meshing engagement. Thus the apex 64 tends to sweep along crop material resting against the surface 62A1 tending to cause longitudinal cracking. Furthermore the surfaces 63D and 63D1 tend to come together to provide a space D4 which causes further compression of the crop material. Thus the apex 64B tends to sweep over the surface 62A2 of the flute 60E. All of these actions tend to improve the conditioning action by repeatedly compressing the crop material to a minimum compression position and then tending to sweep and apex over a surface to carry out longitudinal cracking.

It will be noted that, in order to achieve this parallel position of the surfaces 62A and 62A1, that the roller 57 is identical to the roller 56 and arranged in the same orientation so that, when rotating in the opposite direction to feed into the space between the rollers, the portions 63D of the surfaces are leading surfaces and the surface 62A are trailing surfaces.

Figure 7:
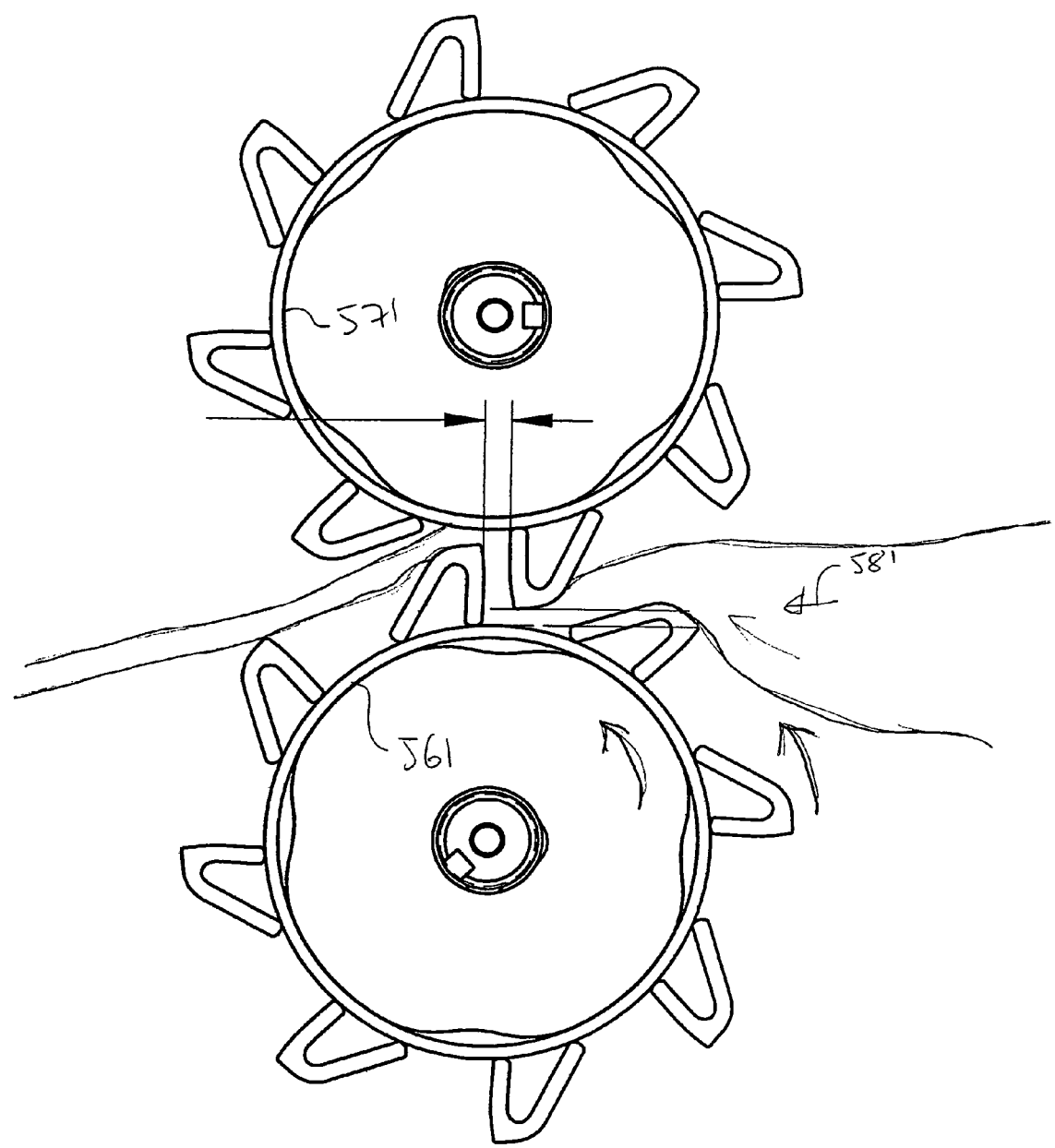
FIG. 7 is a transverse cross sectional view through the rollers similar to that of FIG. 4 showing rollers reversed for feeding of crop in the opposite direction.

Turning now to FIG. 7, there is shown an arrangement which is substantially identical to that of the previous embodiment with the only difference being that the rollers 561 and 571 are reversed end to end. It will be noted in this regard that the view of FIG. 7 is taken from the other end of the roller so that crop material is moving along the line 581 from the right-hand side and passes over the second surface of the flute of the bottom roller which is the leading surface. In some arrangements of conditioning system, depending upon the position of the feed from the discharge of the harvesting header and other conditions of the crop material, it is in some cases better to invert the rollers as set forth above.

In FIG. 8 is shown a further embodiment of the flute as indicated at 601 and this embodiment the plate 631 includes a further bend 632 to provide a portion 633 which is at right-angles to the surface of the roller. This allows the weld bead B3 to be located behind the portion 633.

In FIG. 9 is shown a further alternative in which the flute 682 is formed from a solid bar which is shaped to define the surfaces 62A, 63E and 63D substantially as previously described. The bar is welded to the surface of the roller by beads B4 and B5.

It is believed that the rolls as described above give a better balance of the above desired characteristics as follows:

Ability to crush stems to a much greater degree than crimping style bars at closer intermeshes. It becomes a crimping style bar at greater intermesh distances if that is what the customer prefers.

More durability, superior ability to feed than elastomer designs.

Much less crop chopping than the conventional v-bar style when set at tight intermeshes. (Sharper corner less prominent at the timing point that produced the greatest deflection of crop.)

Better balance of crush and crimp and excellent feeding characteristics leaves crop with even, porous windrows for faster dry-down.

Degree of conditioning adjustable by adjusting intermesh and timing.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A conditioner for conditioning cut crop material from a harvester comprising:

a bottom roller and top roller, each of tho bottom and top rollers having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the bottom and top rollers in generally parallel relationschip for rotation of each roller about its axis such that the flute of the bottom roller intermesh with the flutes of the top roller;

a drive assembly for driving the bottom and top rollers at a common rotation speed in opposite directions to cause conditioning of crop material fed between the bottom and top rollers;

each flute of the bottom and top rollers comprising a body defining a first surface and a second surface converging to a common apex;

each of the first and second surfaces having an end edge thereof at the surface of the roller parallel to the apex and spaced from the apex;

the first surface having an extent from the apex to the end edge thereof which is shorter than that of the second surface;

the first and second surfaces being arranged such that a line joining the apex to the end edge of the first surface lies at an angle to a tangent to the roller surface which angle is greater than a corresponding angle of a line joining the apex to the end edge of the second surface relative to a tangent to the roller surface;

wherein the flutes of one of the rollers are arranged relative to a direction of rotation of said one of the rollers such that the first surface is leading and the second surface is trailing and the flutes of the other of the rollers are arranged relative to a direction of rotation of said other of the rollers such that the first surface is trailing and the second surface is leading.

2. The conditioner according to claim 1 wherein the first surface is substantially radial such that the apex is substantially radially outward of the end edge of the first surface; and wherein the second surface is shaped so as to define a first portion at the apex substantially at right angles to the first surface and a second portion inclined to the first portion and inclined angularly around the surface of the roller and inwardly toward the surface of the roller at an angle to a tangent to the surface of the roller less than ninety degrees.

3. The conditioner according to claim 2 wherein the second portion of the second surface is generally planar.

4. The conditioner according to claim 2 wherein the second portion of the second surface lies approximately at 45 degrees to a tangent to the roller surface.

5. The conditioner according to claim 1 wherein the second surface includes a first portion generally parallel to a tangent to the roller surface and a second portion inclined toward the roller surface.

6. The conditioner according to claim 1 wherein the second portion of the second surface lies approximately at 45 degrees to a tangent to the roller surface.

7. The conditioner according to claim 1 wherein the flutes of the bottom roller are arranged relative to a direction of rotation of the bottom roller such that the first surface is leading and the second surface is trailing.

8. The conditioner according to claim 1 wherein the first surfaces of said one of the rollers and the first surfaces of said other of the rollers are arranged to pass through a condition in which the first surfaces of intermeshing flutes are substantially parallel and on opposite sides of a line joining the centers of the rollers.

* * * * *